A. B. ANTHONY.
BEEHIVE.
APPLICATION FILED OCT. 10, 1911.

1,036,950.

Patented Aug. 27, 1912.

Witnesses
Martin H. Olsen
Robert Dobberman

Inventor
Albert B. Anthony
By Rector, Hibben, Davis & Macauley
His Att'ys.

A. B. ANTHONY.
BEEHIVE.
APPLICATION FILED OCT. 10, 1911.

1,036,950.

Patented Aug. 27, 1912.
5 SHEETS—SHEET 5.

UNITED STATES PATENT OFFICE.

ALBERT B. ANTHONY, OF STERLING, ILLINOIS.

BEEHIVE.

1,036,950. Specification of Letters Patent. Patented Aug. 27, 1912.

Application filed October 10, 1911. Serial No. 653,875.

*To all whom it may concern:*

Be it known that I, ALBERT B. ANTHONY, a citizen of the United States, residing at Sterling, in the county of Whiteside and State of Illinois, have invented certain new and useful Improvements in Beehives, of which the following is a specification.

My invention relates to beehives and the object thereof is to produce a beehive embodying many novel and useful features of construction and mode of manipulation as compared with the usual and well known type of beehive.

Speaking in general terms my beehive comprises a brood-frame chamber or case supported on and detachable from a stand and containing a series of brood frames pivotally suspended therein, the case being sectional with the result that when such chamber is tilted on its end by a suitable instrument and the lowermost section is removed, all of the brood frames are exposed and readily accessible for examination as to queen cells, diseased brood, etc., and examination in general with regard to amount of honey or brood contained. As is well known it is important that the brood frames be examined quite frequently and that this work be done with rapidity in order to economize time and to prevent chilling of the brood in cool weather and robbing by robber bees from other hives particularly in times of honey scarcity. Moreover the brood frames are so suspended or pivoted that they may be readily detached from their bearings and removed either from the top or bottom of the brood chamber. Furthermore, the construction and arrangement of the parts of my beehive are such that the brood frames are examinable without the necessity of removing the supers or exposing the top portions of the brood frames, thereby preventing robbing by robber bees and permitting the operator's work to proceed with extreme facility and without interruption. I prefer to incline the brood chamber to the horizontal and to divide such chamber or case on a diagonal plane. In connection with a hive of this structure I provide a novel construction of comb honey surplus case or super which is adapted to rest upon the top of the brood chamber and also to fit over and upon and to surround such chamber to afford protection in the cold seasons of the year and when not required to hold the surplus honey frames.

Other novel and advantageous features of construction and manipulation will be apparent from the description hereinafter given.

In the drawings Fig. 12 a plan view of the hive when turned over on its end and showing the lower section of the brood chamber removed; Fig. 13 a side elevation of the hive illustrated in Fig. 12; Fig. 14 a detail of a part of the hive-turning instrument.

For the purpose of a clear and definite disclosure of my invention, I will proceed to describe the same in connection with my present form and construction of beehive as herein illustrated but it will be understood that I do not intend to limit myself specifically thereto but contemplate changes in form, proportions of parts and the substitution of equivalents as may be required or rendered expedient.

Figure 4:
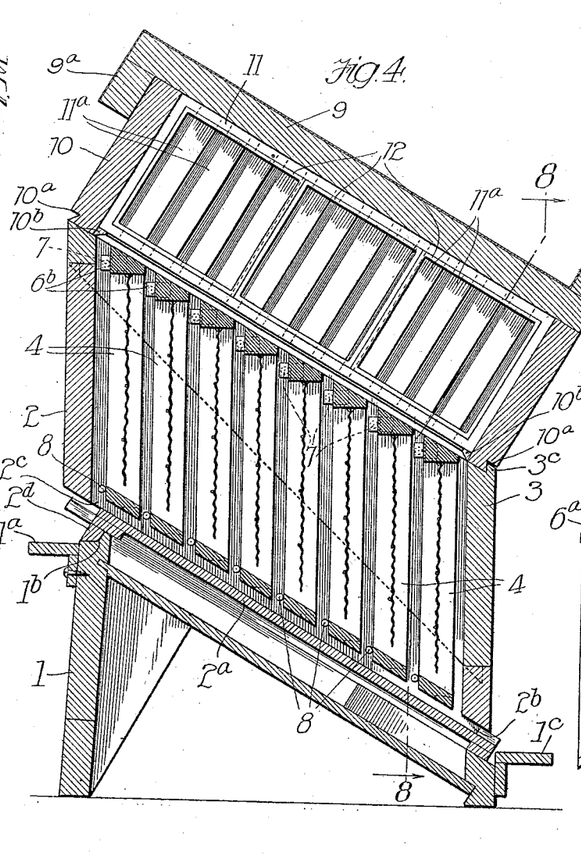
Fig. 4 a central vertical cross section of the hive.

As herein shown I provide a suitable stand 1 which may be made of suitable material and of a single piece or built up as illustrated and having an inclined supporting surface, such inclination being here shown as at a considerable angle, although such angle may be varied as desired. Upon this stand is supported the brood chamber or case which is made in two sections 2 and 3 which are complementary so as to form the brood chamber rhomboidal in cross section as indicated in Fig. 4, the line of division being in a plane oblique to the horizontal and substantially diagonal of the chamber. The section 2 is provided with a bottom $2^a$ which closes the chamber thereat except for the lower bee opening $2^b$ and the upper bee opening $2^c$. The purpose of having two such openings or entrances in the opposite sides of the hive and their different heights will be hereinafter made apparent. The two sections of the chamber or case are interlocked one with the other by suitable rabbets $x$ and $x'$ at the meeting four corners of such sections in the manner indicated in Figs. 1, 4 and 21 thereby insuring tight fitting between the two sections and at the same time preventing sidewise slipping and displacement of such sections. The lower section 2 is likewise interlocked with the stand in suitable manner as by means of the tongue or projection $2^d$ fitting upon the rabbet $1^b$ along the higher side of the stand, Figs. 1 and 4. The stand may be provided with the usual alighting boards $1^c$ and $1^a$.

Within the brood chamber or case are arranged the series of brood frames 4 which are suspended at their upper portions and in an offset or offcenter manner. As shown in detail in Fig. 6 each brood frame is substantially rectangular except that its top and bottom are inclined to correspond with the inclination of the brood chamber and to leave bee space all around them including particularly bee space between their lower edges and the bottom $2^a$ and also above the top edges thereof. These brood frames are pivoted at their upper portions and on one side by suitable bearing members which cooperate with bearing members in the upper inner ends of the upper section 3. In the present instance, I provide one of the upper corners of each brood frame with a horizontal bearing pin 5 and the other upper corner with a plate or hinge 6, both of them being suitably secured thereto. The bearing pins 5 are adapted to be received in sockets $3^a$ near the top edge of one end of the upper section 3, by preference a thin piece of sheet metal $3^b$ being secured along the line of the sockets which pass therethrough. The plate or hinge 6 is of the irregular shape shown in Figs. 6 and 7, the same having a recess $6^a$ adapted to fit upon its bearing pin 7 near the adjacent top edge of the other end of the brood chamber, Fig. 8. This plate 6 is so formed as to provide a shoulder $6^b$ adapted to contact the exposed end of the bearing pin 7, thereby preventing endwise movement of the brood frame. It will be understood that any one of the brood frames may be readily and quickly detached from its bearings and removed from the brood chamber by merely raising one corner of the frame upwardly to release the plate or hinge 6 from its bearing pin, then swinging such corner laterally to a slight extent and then moving the frame endwise to release the bearing pin 5 from its socket. The entire frame is now free to be removed and this can be done either from the top after the cover or super has been removed or from the bottom of the brood chamber when the latter has been turned over on its end in a manner hereinafter explained. In practice and by preference I provide more space between the one end of the brood chamber and one end of the brood frames, such wider space being shown at the left hand end of the brood frames in Fig. 8. The object of this arrangement is to give sufficient bee-space to prevent crushing of the bees when the brood frames are operated in the manner just described.

By pivotally suspending the brood frames the same swing to a vertical position and in order that they may swing a little beyond such position the bearing members thereupon are attached offcenter, the tendency of the frames being thereby to swing toward the left when viewed as in Fig. 4. In order to limit this swinging movement of the frames and to distance them properly and uniformly, I provide suitable limiting means or stops which here consist of the series of horizontal pins 8 projecting inwardly from opposite ends of the lower section 2 of the brood chamber as clearly indicated in Figs. 4 and 8. Thus it will be seen that the brood frames will come to rest when their lower edges are in contact with these pins as seen in Fig. 4.

As clearly shown in Fig. 4, the brood frames are pivotally supported at their upper ends within the brood chamber case and in a plane which is oblique to the horizontal. It results from this construction that the distance between the points of pivotal support of adjacent frames is greater than the spacing distance between the frames, that is to say, the distance from center to center of such frames.

Figure 1:
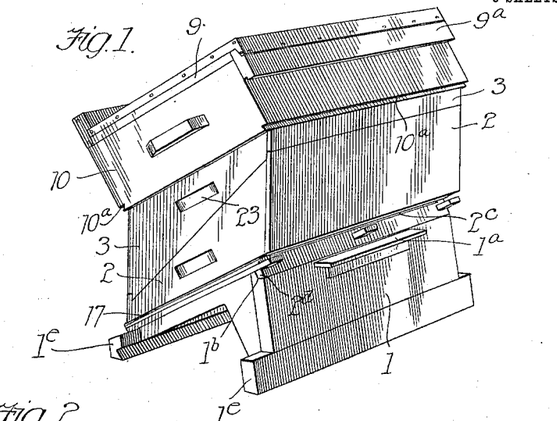
Figure 1 is a perspective of a beehive embodying my invention and illustrating a single super thereon.

The beehive as thus far described, when provided with a suitable cover or top such as that shown at 9, would provide a complete structure embodying most of the features of my invention, but before describing the manipulation of the hive I will proceed to describe the entire structure herein shown including the super or supers. The super 10 is of rectangular form and of peculiar construction and dimensions so as to telescope or fit over the brood chamber when required for cold weather protection. As clearly shown in Fig. 4 the lowermost top edge of the section 3 and the lowermost bottom edge of the super are interlocked in suitable manner, as by means of the rabbet $10^a$ and tongue $3^c$ shown in Fig. 4, with the result that the super is held in place and prevented from slipping downwardly with respect to the brood chamber. The super is preferably provided along its opposite bottom edge with another rabbet $10^a$ so that the position of the super may be reversed in order to cause the bees to fill the honey boxes uniformly throughout the super in seasons of slow honey flow or during cool weather. In the usual type of hive, as is well known, the filling of the middle of the surplus case is frequently much in advance of the surrounding portions while in my inclined type of hive, the higher side has the bees' preference owing to the greater warmth thereat. My reversal of the super therefore tends to equalize work therein. The top or cover 9 rests upon the super as shown in Figs. 1 and 4 and the same is provided with a flanged edge $9^a$ to hold the same in place.

Figures 5, 6, 7:
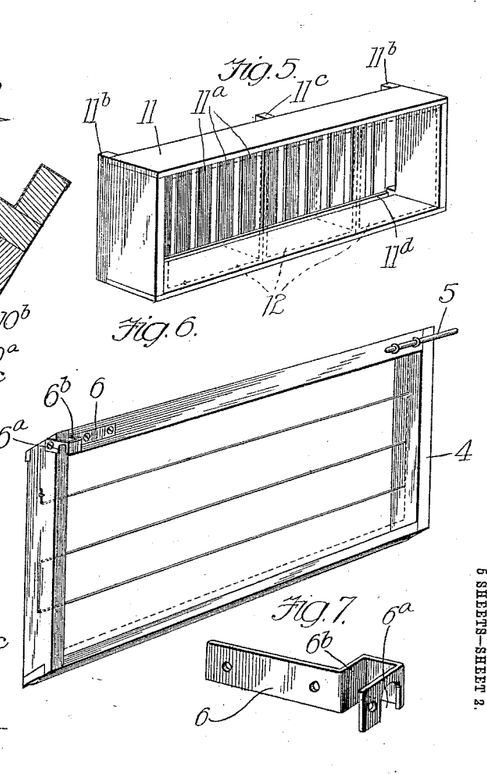
Fig. 5 a perspective of one of the honey frames.
Fig. 6 a perspective of one of the brood frames.
Fig. 7 a detail of one of the bearing members on the brood frames.

Supported in the super upon the cleats or projections $10^b$ is arranged a series of honey frames 11, one of which is shown in detail in Fig. 5. These frames are rectangular and provided at one side with a series of slats or separators $11^a$ and the same are adapted to receive honey boxes 12, three of the boxes being received by each frame. Each of these frames is provided at two of its corners with vertical distance strips or cleats $11^b$ in order to provide for the proper amount of bee space between the frames and also with blocks $11^c$ in order to keep the honey boxes in place, particularly when the position of the super is reversed. Each frame is also preferably provided with strips $11^d$ to space the boxes back from the separators $11^a$ to the extent of a half bee-space and thereby cause the bees to sufficiently fill that side of the box without filling it flush. This is also of advantage in crating the boxes. For holding these frames compactly together, I provide a follower plate or board 13 which is spring-pressed against the frames in suitable manner as by means of the two curved springs 14, which are readily insertible and removable in place. In order to provide the proper bee space the follower board is provided with the vertical strips or cleats $13^a$.

Owing to the well known habit of bees of gumming or gluing up with propolis every crevice and contact point in a hive, I have constructed my super and section frames with the least possible number and extent of contact points. In my construction there are contact or gluing points at the section frame ends only, excepting for slight contacts at the blocks $11^c$, Figs. 5 and 9, with the result that owing to the lesser amount of "stuck-up" surface, the apiarist is enabled to the more easily remove any part of the super contents for any purpose desired. Moreover, under my construction the bees are afforded full communication between the sections.

Figure 8:
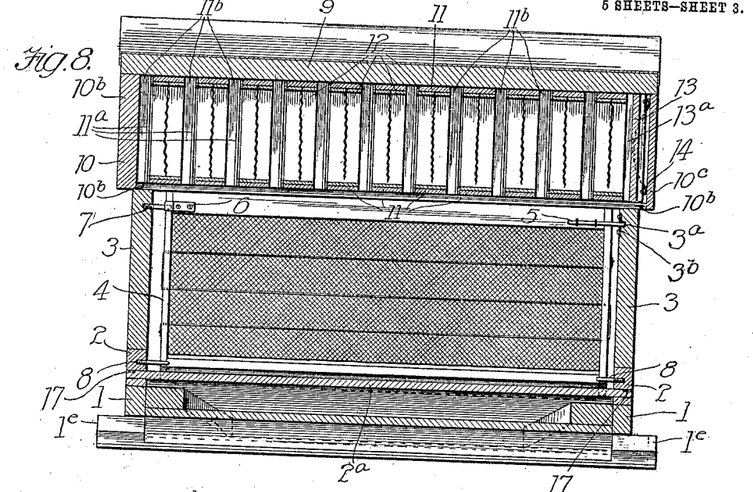
Fig. 8 a vertical section on the irregular line 8—8 of Fig. 4.
Figures 9, 10, 11:
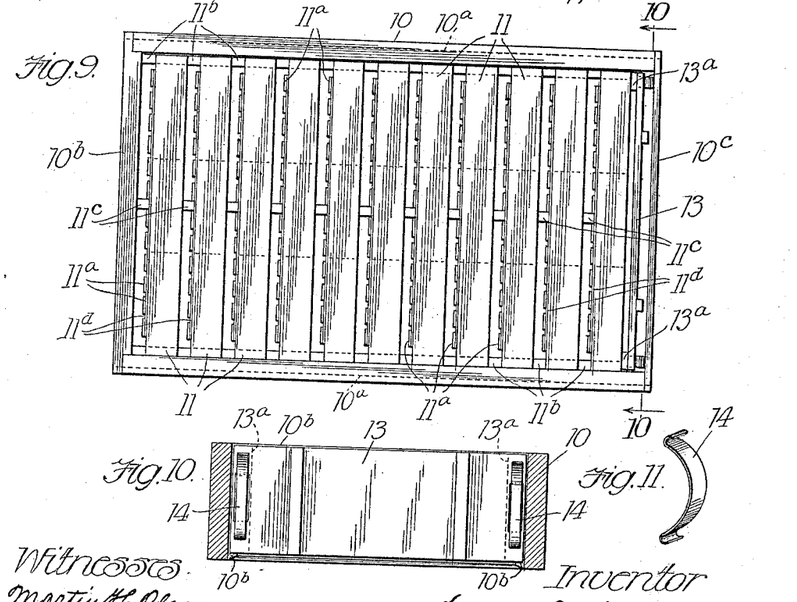
Fig. 9 a top plan of one of the supers shown filled with the honey frames.
Fig. 10 a sectional elevation on the line 10—10 of Fig. 9.
Fig. 11 a perspective of one of the springs used in pressing a follower board against a honey frame.
Figures 16, 17, 18, 19, 20:
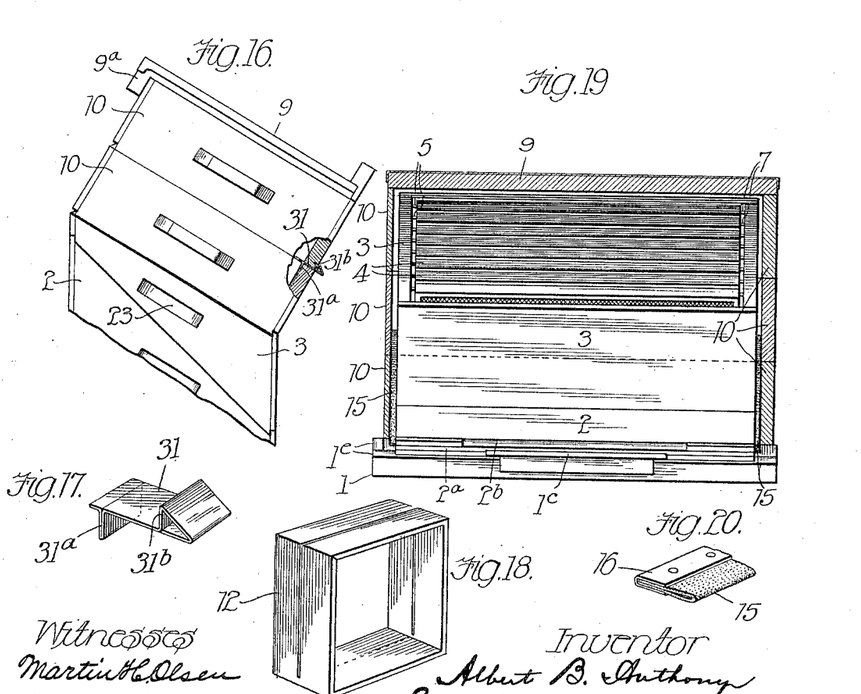
Fig. 16 an elevation of a portion of a beehive showing manner of attaching two or more supers.
Fig. 17 a detail view of one of the retainers shown in Fig. 16 for holding the uppermost super in place.
Fig. 18 a perspective of one of the honey boxes.
Fig. 19 a sectional elevation of the hive showing the employment of three supers telescoping the brood chamber for protection purposes.
Fig. 20 a detail view of a portion of a strip used in the structure illustrated in Fig. 19, and Fig. 21 a detail view showing the method of interlocking the two sections of the brood chamber.

In order to permit the super to fit over the brood chamber the same is made in the manner and in the general proportions illustrated in Figs. 8, 9 and 19 wherein it is seen that the two ends $10^b$ and $10^c$ are of unequal thickness, the former being the thicker. When the super is in position upon the top of the brood chamber it is supported by the latter, the ends of the super projecting slightly beyond the ends of the brood chamber, the thicker end $10^b$ making closed joint with the top edge of the brood chamber and the thinner end $10^c$ of the super making closed joint with the brood chamber but projecting therebeyond. However, the brood chamber is closed along this end or edge by means of the follower board 13. When the honey frames and board are removed from the super, the latter can be telescoped or fitted over the obliquely positioned brood chamber by holding such super in a horizontal position and then lowering the same over the brood chamber. By using a plurality of these supers as seen in Fig. 19 and also employing the top or cover 9 a complete protecting inclosure for the brood chamber is formed, the space being properly filled with chaff or the like as is usual in protection of beehives. When thus using the supers I prefer to provide strips acting like weather strips and formed as shown in Fig. 20 wherein a strip 15 of cloth or other suitable material is clamped between and secured to a metal strip 16, said strip being received in grooves 17 formed at the junction between the bottom section 2 and the bottom board. Thus when the supers are fitted over the brood chamber as seen in Fig. 19, the space between is closed and sealed by these strips.

Figure 2:
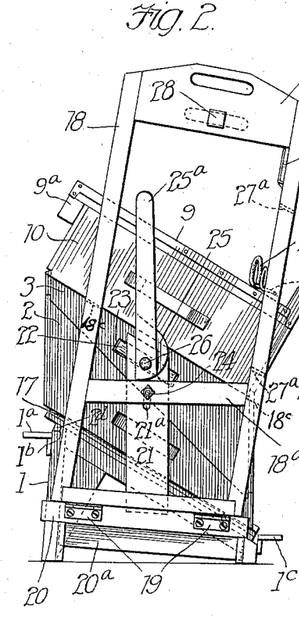
Fig. 2 an end elevation thereof showing in position the frame or instrument for turning the hive over upon its end.
Figures 12, 13, 14, 21:
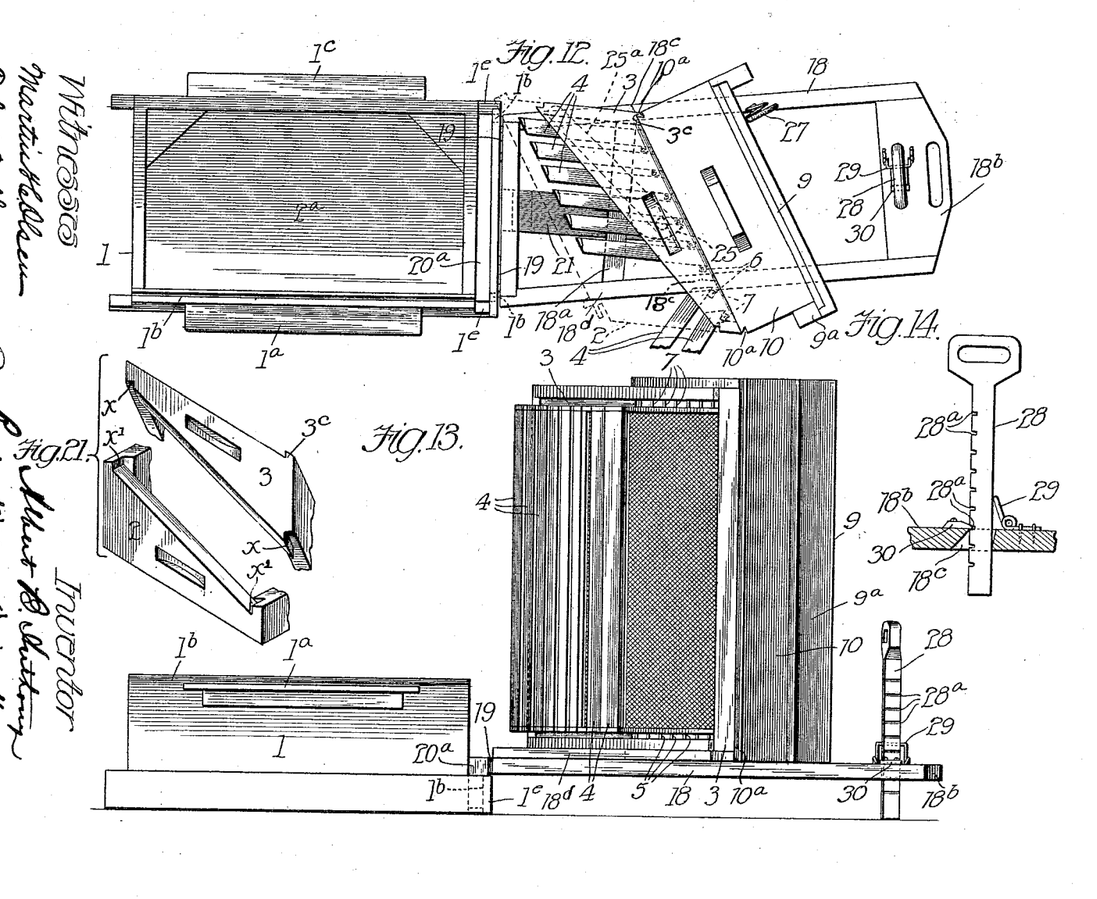
Figure 15:
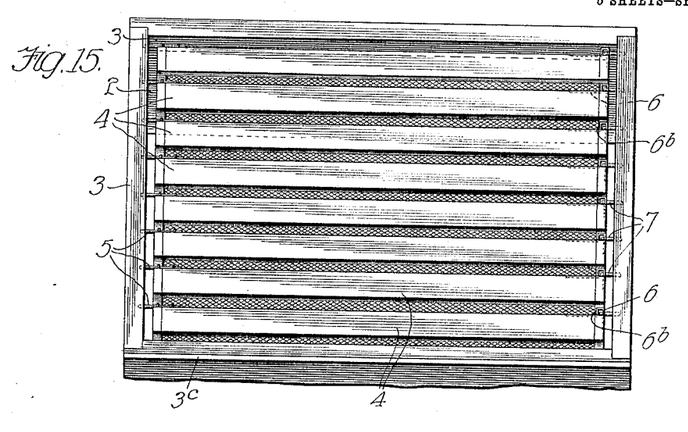
Fig. 15 a plan view of the brood chamber and brood frames therein.

When the beehive is constructed as above explained the same may, if desired, be manipulated in the usual way, that is by removing the cover and also the super if used and then removing the brood frames, but for the purposes of ready and rapid examination of these frames by merely swinging them in position for examination without removing them, I employ means for tilting over onto one end the entire beehive with the exception of the stand and then merely removing the bottom section 2 of the brood chamber as shown in Figs. 12 and 13. The device or instrument which I prefer to provide for this turning or tilting of the beehive on end is illustrated in Figs. 2, 3, 12, 13 and 14, the same consisting of a frame 18 which is hinged by means of the two hinges 19 to a cross piece 20 at the lower or inner end thereof. This cross piece is provided with a depending portion 20$^a$ which is adapted to fit in the space formed by the two projecting portions 1$^e$ and the cleats 1$^f$ of the stand while the ends of the cross piece 20 rest upon the top thereof. To the frame 18 is secured a vertical strip 21 which is provided on its inner side with a transversely arranged and inclined block 22 which is of a size and shape to enter the hand hole 23 in the upper section 3 of the brood chamber. This strip 21 has a slight movement or adjustment with respect to the frame by reason of the bolt and slot connection between it and the cross piece 18$^a$ of the frame, the bolt being indicated at 24 and the slot, which is in the strip 21, being indicated at 21$^a$. For the purpose of adjusting or moving this strip, I provide a cam 25 having a handle 25$^a$ and pivoted to the strip 21 by the same bolt 26 which secured the block 22 thereto. This cam is adapted to press upon the cross piece 18$^a$ and to thereby lift the strip 21 and the same is used in order that when the hive is swung back into place it shall properly mount the stand and not drag over it, thereby avoiding possible breaking of strip 2$^d$ and enabling the hive to better take its place upon the stand. The instrument is also provided with a spring 27 adapted to be detachably secured to the frame intermediate its length, at one of several different points, and in a position to press rather firmly upon the top or cover of the hive and thereby hold it in place in the turning movement. As shown in Fig. 2, one of the side bars of frame 18 has a series of sockets 27$^a$ to receive one end of the spring 27, the latter being thereby adjustable in position to accommodate the height of the hive as determined by the presence of supers and the number thereof. By preference the instrument is also provided with a combined handle and rest, the same consisting of a bar or strip 28 passing through the upper end or cross piece 18$^b$ of the frame transversely thereof, and adapted to be held in different adjusted positions. The inner side of the frame is preferably formed with two inclined shoulders 18$^c$ at different heights and adapted to fit under the lowermost super. As shown in detail in Fig. 14 the bar passes through the enlarged opening 18$^c$ and when in its right-angled position to which it is pressed by means of the spring 29 one of its series of notches 28$^a$ is engaged by the edge of a plate 30. The bar or handle is released from such engagement by swinging the handle against the tension of the spring 29 and then moving the same up or down to the proper position. The lower end of this handle is adapted to rest upon the ground as shown in Fig. 13 while the upper end thereof is fashioned as a handle to furnish a grip for the operator in handling the instrument and turning the hive. The device may also be provided with a spirit level or the like 18$^e$ as it is desired that the instrument be slightly below level at its other end.

Figure 3:
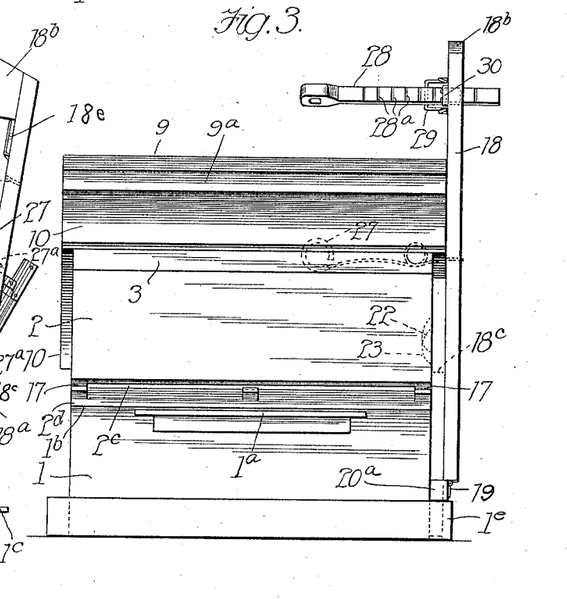
Fig. 3 a side elevation of the hive and instrument illustrated in Fig. 2.

In practice the instrument or tool described is first applied in vertical position to the hive as illustrated in Figs. 2 and 3 at which time the instrument rests upon the stand 1 and the block 22 enters the hand hole 23. The operator with one hand in the lower hand hole in the opposite end of the instrument and hive now tilts the instrument and hive over on its end to the position indicated in Figs. 12 and 13 and then removes the lower section 2 of the brood chamber which is separable and detachable from both the stand and its companion section. This leaves the brood frames subject to opening to full exposure, the same being shown partly open in Fig. 12 and being particularly exposed at the bottoms where the queen cells are located. The instrument is given the inclination illustrated in Fig. 2 in order to accommodate the general inclination of the hive, and the preferred construction is such that the lower right-hand corner shown in Fig. 12 is a little lower, so as to give a corresponding inclination to the brood frames, with the result that these frames will lie in their normal position or to any manipulated position such as that shown by two of them in Fig. 12, and will remain in those positions until moved by the operator. In this manner and by these means the brood frames can be examined very easily and very quickly, which is a great desideratum, especially where a large number of beehives have to be examined from time to time, particularly for the destruction of queen cells to prevent swarming. After the described examination the lower section 2 is replaced, and the instrument, together with the attached hive, is tilted back to its original position, and the instrument removed. In the above described operation the cam is moved just before the hive is turned over, so that the brood chamber will be raised somewhat above the stand to prevent injury to the parts when the hive is turned back to normal position. At the proper time the cam is operated in the opposite direction and the hive proper lowered to normal position.

Either side of the hive may be used or considered as the front, as either of the two bee entrances may be employed. It will be understood that one entrance at a time is employed, the other being closed. One or the other entrance is used, according to the workings of the bees in the hive, so that the honey frames shall be filled uniformly. As is well known, bees put their honey above and back of the entrance, and their brood adjacent thereto. Advantage is taken of this fact by using the higher entrance in the warm and honey gathering season of the year, thereby having them work in the super rather than to favor them with a high and remote brood frame region for honey storage at the expense of the supers. The lower entrance is used when little or no honey is coming in, as in cool seasons. My construction of hive, moreover, enables me to employ a rather shallow brood chamber with the advantage of the deep ones.

The above described manner of pivotally suspending the brood frames, particularly the off center pivoting thereof, is advantageous, not only in the turning of the frames for examination purposes, but also in the spacing of the frames, inasmuch as such peculiar pivoting of the frames causes them to tend to swing by gravity beyond a perpendicular position until they come into contact with the stop pins. Moreover, this construction and arrangement of the brood frames affords the least possible chance of the bees sticking the frames with propolis. Furthermore, the described construction of each brood frame is such that in the operation of obtaining extracted honey, the uncapping knife can be readily and advantageously employed, inasmuch as no frame-spacing device is present to interfere.

When an extracting-super is used, the same may be made similar to the brood chamber or case and provided with frames similar to the brood frames, with the exception that, if desired, the extracting-super and its frames may be made somewhat shallower. Such an extracting-super or supers may be mounted upon the brood chamber.

As shown in Fig. 16, a plurality of supers may be used in which event I employ detachable retainers 31 of the form shown in Fig. 17, preferably two of them being located in the lowermost side joint between the two supers. Each retainer is here shown as made of sheet metal with a portion thereof bent to form the two shoulders or flanges 31ª and 31ᵇ, the former fitting against the inner edge or face of the lowermost super and the other against the outer edge or face of the uppermost super, the flat body of the retainer being in said joint between the supers.

I claim:

1. In a beehive, the combination, with a brood chamber case, of brood frames pivoted therein and removable therefrom either from above or below.

2. In a beehive, the combination, with a brood chamber case, of brood frames pivotally suspended off center therein and removable therefrom either from above or below.

3. In a beehive, the combination, with a brood chamber case, of brood frames pivoted off center therein, and means for limiting the movement thereof.

4. In a beehive, the combination, with a brood chamber case open at top and bottom, of brood frames pivotally suspended therein from their upper ends and removable therefrom either from above or below.

5. In a beehive, the combination, with a brood chamber case open at top and bottom, of brood frames pivoted at their upper corners to the upper portion of the case and removable therefrom either from above or below.

6. In a beehive, the combination, with a brood chamber case, with its top and bottom planes oblique with the horizontal, of brood frames pivoted at their upper ends in said plane.

7. In a beehive, the combination, with a brood chamber case with its top and bottom planes oblique with the horizontal, of brood frames spaced apart and pivotally supported within the case, the distance between the pivotal supports of adjacent frames being greater than the spacing distance between the frames, the frames being pivoted at their upper ends in a plane parallel to said planes.

8. In a beehive, the combination, with a brood chamber case, of brood frames pivoted therein and having a limited endwise movement, the ends of the frames being spaced from the sides of the case a greater distance at one end than at the other.

9. In a beehive, a brood chamber case divided into upper and lower sections which are separable from each other, and brood frames pivoted in one of the sections and removable from either above or below.

10. In a beehive, a brood chamber case divided into upper and lower sections which are separable from each other, and brood frames pivotally suspended in the upper section and removable from either above or below.

11. In a beehive, a brood chamber case divided along a plane oblique to the horizontal into upper and lower sections which are separable from each other, and brood frames pivoted in one of the sections and removable from either above or below.

12. In a beehive, a brood chamber case divided along a plane oblique to the horizontal into upper and lower sections which are separable from each other, and brood frames pivotally suspended in the upper section and removable from either above or below.

13. In a beehive, a brood chamber case divided into upper and lower sections which are separable from each other, and brood frames pivoted off center in the upper section.

14. In a beehive, a brood chamber case divided into upper and lower sections which are separable from each other, brood frames pivoted off center in the upper section, and means for limiting the movement thereof.

15. In a beehive, a brood chamber case divided into upper and lower sections which are separable from each other, brood frames at their upper portions pivoted off center in the upper section, and means coöperating with the lower portions for limiting the movement thereof.

16. In a beehive, a brood chamber case divided into upper and lower sections which are separable from each other, brood frames pivotally mounted off center in the upper section, and means located in the lower section and coöperating with the lower portions of the brood frames for limiting the movement of the latter.

17. In a beehive, a brood chamber case divided into upper and lower sections which are separable from each other, brood frames pivotally mounted off center in the upper section, and a series of pins located in the lower section and arranged to coöperate with the lower portions of the brood frames to limit their movement.

18. In a beehive, a brood chamber case divided into upper and lower sections which are separable from each other, and brood frames pivotally mounted in and detachable from the upper section.

19. In a beehive, a brood chamber case divided into upper and lower sections which are separable from each other, and brood frames pivotally mounted in the upper section, such latter section being open at top and bottom and the frames being removable through either top or bottom.

20. In a beehive, a brood chamber case divided into upper and lower sections which are separable from each other, and brood frames pivotally mounted in the upper section, such latter section and the upper portions of the frames having at their opposite sides coöperating pins and sockets for the pivotal connection between such sections and the frames, said case being open at top and bottom and the frames being removable from either top or bottom.

21. In a beehive, a brood chamber case, brood frames pivotally mounted therein, and means for so pivoting the frames and permitting ready detachment and removal of the frames from either top or bottom of the case.

22. In a beehive, a brood chamber case, brood frames arranged within the case, and bearing members coöperating with the frames and case for providing pivotal suspension of the frames, one set of bearing members being arranged to prevent substantial endwise movement of the frames.

23. In a beehive, a brood chamber case, brood frames arranged within the case, the upper portion of the case having at one end a series of sockets and the brood frames having at the corresponding end a series of bearing pins received by such sockets, and such upper portion of the case having at its other end a series of bearing pins and the brood frames having at that end bearing members coöperating with the last mentioned pins.

24. In a beehive, a brood chamber case, brood frames arranged within the case, and coöperating bearing members in the upper portion of the case and on the frames for the pivotal suspension of the latter, the bearing members on the frames being off center and the frames being removable from either top or bottom of the case.

25. In a beehive, a brood chamber case, brood frames arranged within the case, and coöperating bearing members in the upper portion of the case and on the frames for the pivotal suspension of the latter, the bearing members of the frames being located on one side of the upper portions thereof and the frames being removable from either top or bottom of the case.

26. In a beehive, a brood chamber case, brood frames arranged within the case, and bearing members coöperating with the frames and case for providing pivotal mounting of the frames, one set of the bearing members comprising a pin on the case and a plate on a frame, the plate having a notch to receive the pin and also having a shoulder adapted to bear against the end of the pin to prevent endwise movement of the frame.

27. In a beehive, a brood chamber case, brood frames arranged within the case, and bearing members coöperating with the frames and case for providing pivotal mounting of the frames, one set of the bearing members comprising a pin on the case and a plate secured to a frame and arranged to bear upon the pin but being detachable therefrom.

28. In a beehive, a brood chamber case, brood frames arranged within the case, and bearing members coöperating with the frames and case for providing pivotal mounting of the frames, one set of the bearing members comprising a pin on the case and a plate secured to a frame and having a notch arranged to receive the pin for bearing purposes.

29. In a beehive, a brood chamber case, brood frames arranged within the case, and bearing members coöperating with the frames and case for providing pivotal mounting for the frames, one set of the bearing members comprising a pin on the case and a plate secured to a frame and arranged to bear upon the pin, said plate having means for preventing endwise movement of the frame.

30. In a beehive, a brood chamber case divided into upper and lower sections which interlock with and are separable from each other, and brood frames pivoted in one of the sections.

31. In a beehive, a brood chamber case divided into upper and lower sections which are separable from each other, the lower section being closed at its bottom except for bee entrances at its lower side edges, and the other section being open at both top and bottom, and brood frames pivoted in one of the sections.

32. In a beehive, a brood chamber case divided into upper and lower sections, and a series of brood frames which are pivoted in the upper section in a plane oblique to the horizontal.

33. In a beehive, a brood chamber case divided along a plane oblique to the horizontal into upper and lower sections, and a series of brood frames which are pivoted in the upper section in a plane also oblique to the horizontal.

34. In a beehive, the combination of a stand having a supporting surface which is oblique to the horizontal, a brood chamber case mounted in such stand in oblique position and opening at its top and bottom, and brood frames pivoted within such case and removable therefrom from either above or below.

35. In a beehive, the combination, with the brood chamber case, of a super open at top and bottom and arranged to fit upon the case as a surplus case and also to surround the same as a protection.

36. In a beehive, the combination of a brood chamber case positioned oblique to the horizontal, brood frames therein, and a super open at top and bottom and adapted to fit upon the case as a surplus case, said super being of a size to fit over and surround the brood chamber case when applied thereto in horizontal position.

37. In a beehive, the combination of a brood chamber case positioned oblique to the horizontal, brood frames therein, and a super open at top and bottom and adapted to fit upon the case as a surplus case, and to also surround the same as a protection, said case and super having interlocking engagement.

38. In a beehive, the combination of a brood chamber case positioned oblique to the horizontal, brood frames therein, and a super open at top and bottom and adapted to fit upon the case as a surplus case, and to also surround the same as a protection, said case having at the lowermost of its upper corners a rabbet to receive and hold the super.

39. In a beehive, the combination of a brood chamber case, brood frames therein, and a super open at top and bottom and adapted to fit upon the case as a surplus case, the super having an opening of a size to fit over the brood chamber, a series of frames within the super, and a follower arranged at one end of the frames and adapted to close the opening thereat.

40. In a beehive, the combination of a brood chamber case, brood frames therein, and a super open at top and bottom and adapted to fit upon the case as a surplus case, the super having an opening of a size to fit over the brood chamber case and thereby surround the same as a protection, a series of frames within the super, and a spring pressed follower arranged at one end of the frames to close the opening thereat and to hold the frames together.

41. In a beehive, the combination of a brood chamber case, brood frames therein, and a super open at top and bottom and adapted to fit upon the case as a surplus case, the super having an opening of a size to fit over the brood chamber and having one of its end walls thinner than the other, a series of frames within the super, and a follower arranged at that end of the super having the thinner wall and adapted to bear against one end of the series of frames therein.

42. In a beehive, the combination of a brood chamber case positioned oblique to the horizontal, brood frames therein, and a plurality of supers adapted to fit upon the brood chamber case as surplus cases and to be thereby positioned oblique to the horizontal, the lowermost super being interlocked with the case, and means applied to such lowermost super for retaining the one above in place.

43. In a beehive, the combination of a brood chamber case positioned oblique to the horizontal, brood frames therein, and a plurality of supers adapted to fit upon the brood chamber case as surplus cases and to be thereby positioned oblique to the horizontal, the lowermost super being interlocked with the case, and a retainer adapted to be interposed between the meeting edges of the lowermost sides of two supers, such retainer consisting of a plate having a shoulder engaging the inner face of the lower super and another shoulder engaging the outer face of the upper super.

44. In a beehive, the combination of a stand having a supporting surface which is oblique to the horizontal, a brood chamber case mounted on such stand in oblique position, and brood frames pivoted within such case, said stand having end projections to form supports for a hive-turning instrument.

45. In a beehive, the combination of a stand, a brood chamber case thereon, and a hive-tilting device adapted to be pivotally applied to the stand and to engage an end of the case and when swung downwardly to tilt said case over on said end.

46. In a beehive, the combination of stand, a brood chamber case thereon provided with an end hand hold, and a hive-turning device comprising a frame arranged to be pivotally applied to the stand and having a block adapted to engage said hand hold.

47. In a beehive, the combination of a stand, a brood chamber case thereon provided with an end hand hold, and a hive-turning device comprising a frame arranged to be pivotally applied to the stand and having a block adapted to engage said hand hold, said block being adjustable in the frame.

48. In a beehive, the combination of a stand, a brood chamber case thereon provided with an end hand hold, and a hive-turning device comprising a frame arranged to be pitovally applied to the stand and having a block adapted to engage said hand hold, said block being movable in the frame, and a cam for operating the block.

49. In a beehive, the combination of a stand, a brood chamber case thereon, and a hive-turning device comprising a frame adapted to be pivotally applied to the stand and having means of engagement with the case, said frame being arranged to be swung downwardly to turn the case over on its end.

50. In a beehive, the combination of a stand, a brood chamber case thereon, and a hive-turning device adapted to be pivotally applied to the stand and to engage the case and when swung downwardly, to turn said case on its end, said device having an adjustable leg or support.

51. In a beehive, the combination of a stand, a brood chamber case thereon, and a hive-turning device adapted to be pivotally applied to the stand and to engage the case and when swung downwardly, to turn said case on its end, said device having a combined handle and support.

52. In a beehive, the combination of a stand, a brood chamber case thereon, and a hive-turning device adapted to be pivotally applied to the stand and to engage the case and when swung downwardly, to turn said case on its end, said device having a combined handle and support which is adjustably mounted in such device.

53. In a beehive, the combination of a stand having end projections near its base, a brood chamber case removably mounted upon the stand, and a hive-turning device comprising a frame, a cross piece to which such frame is pivoted and which is arranged to rest upon said projections of the stand, and means on the frame for engaging the case.

54. In a beehive, the combination of a stand, a brood chamber case thereon, a top cover for the case, and a hive turning device adapted to be pivotally applied to the stand and to engage the case and, when swung downwardly, to turn said case and cover on end, said device having a spring adapted to bear upon the cover when such device is applied.

55. In a beehive, the combination of a brood chamber case arranged in an oblique position, a plurality of supers thereon, and a removable retainer located between the meeting edges of two supers and engaging both to hold them in position.

56. In a beehive, the combination of a brood chamber case arranged in an oblique position, a plurality of supers thereon, and a removable retainer located between the meeting edges of two supers and engaging both to hold the upper one in position, such retainer consisting of a plate having a shoulder engaging the inner side of the lower super and another shoulder engaging the outer side of the upper super.

57. A honey frame comprising a frame proper having projections along a side thereof, and honey boxes adapted to fit against such projections, leaving a half bee-space on said side.

58. A honey frame comprising a frame proper having separators secured thereto and projections along a side thereof, and honey boxes adapted fit against such projections.

ALBERT B. ANTHONY

Witnesses:
S. E. HIBBEN,
ROBERT DOBBERMAN.